(12) United States Patent
Rodriguez Bravo

(10) Patent No.: US 10,628,722 B2
(45) Date of Patent: Apr. 21, 2020

(54) METHOD AND APPARATUS TO ENHANCE THE SECURITY OF CONTACT-LESS CARDS

(71) Applicant: INTERNATIONAL BUSINESS MACHINES CORPORATION, Armonk, NY (US)

(72) Inventor: Cesar Augusto Rodriguez Bravo, Alajuela (CR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/934,141

(22) Filed: Mar. 23, 2018

(65) Prior Publication Data

US 2019/0294940 A1     Sep. 26, 2019

(51) Int. Cl.
| | |
|---|---|
| G06K 19/06 | (2006.01) |
| G06K 19/07 | (2006.01) |
| G06K 19/073 | (2006.01) |
| G06K 19/077 | (2006.01) |

(52) U.S. Cl.
CPC ... *G06K 19/0716* (2013.01); *G06K 19/07345* (2013.01); *G06K 19/07749* (2013.01); *H01H 2231/05* (2013.01)

(58) Field of Classification Search
CPC ............ G06K 19/07749; G07F 7/1008; G06Q 20/341
USPC ........................................................ 235/492
See application file for complete search history.

(56) References Cited

U.S. PATENT DOCUMENTS

| | | |
|---|---|---|
| 5,705,852 A | 1/1998 | Orihara et al. |
| 7,100,835 B2 | 9/2006 | Selker |
| 7,597,250 B2 | 10/2009 | Finn |
| 7,624,927 B2 | 12/2009 | Lu et al. |
| 7,815,126 B2 | 10/2010 | Top |
| 7,946,501 B2 | 5/2011 | Borracci |
| 7,950,585 B2 | 5/2011 | Skowronek et al. |
| 8,536,981 B2 | 9/2013 | Seban et al. |
| 8,537,025 B2 | 9/2013 | Le Garrec et al. |

(Continued)

FOREIGN PATENT DOCUMENTS

WO     2013096557 A1     6/2013

OTHER PUBLICATIONS

Alphr, "Here's how to protect your contactless card from scammers on public transport", Technology, Feb. 17, 2016, 17 pages, http://www.alphr.com/technology/1002719/heres-how-to-protect-your-contactless-card-from-scammers-on-public-transport.

(Continued)

*Primary Examiner* — Ahshik Kim
(74) *Attorney, Agent, or Firm* — Anthony M. Pallone

(57) ABSTRACT

A structure for a contact-less card, the contact-less card may include a touch sensor electrically coupled to a fixed power source or electrically coupled to an antenna. The contact-less card may include a contact-less communication controller electrically coupled to the touch sensor. The contact-less communication controller includes an integrated circuit containing card information. The integrated circuit transmits the card information based on a signal from the touch sensor. The contact-less card may include an antenna electrically coupled to the contact-less communication controller. The antenna transmits card information received from the contact-less communication controller.

19 Claims, 6 Drawing Sheets

(56) References Cited

U.S. PATENT DOCUMENTS

| | | | |
|---|---|---|---|
| 8,602,306 | B2 | 12/2013 | Deborgies |
| 9,379,841 | B2 | 6/2016 | Fine et al. |
| 2003/0107300 | A1 | 6/2003 | Nakamura et al. |
| 2006/0290519 | A1 | 12/2006 | Boate et al. |
| 2009/0159678 | A1 | 6/2009 | Day et al. |
| 2010/0013631 | A1 | 1/2010 | Laackmann et al. |
| 2014/0015822 | A1 | 1/2014 | Hu et al. |
| 2016/0203346 | A1* | 7/2016 | Gardiner ............ G06K 7/10158 235/380 |
| 2016/0307189 | A1* | 10/2016 | Zarakas ............... G06Q 20/352 |
| 2017/0326024 | A1 | 11/2017 | Hernandez |
| 2018/0129831 | A1* | 5/2018 | Yokoi ..................... G06F 21/32 |

OTHER PUBLICATIONS

Bischoff, "Could you fall prey to a contactless conman? How Thieves can take money from your card as you're walking down the street", Daily Mail News UK, Published Oct. 18, 2016, 47 pages, http://www.dailymail.co.uk/news/article-3849368/Could-fall-prey-contactless-conman-thieves-money-card-walking-street.html.

GlobeNewswire, "Index launches breakthrough fingerprint sensor for contactless smart cards", One News Page, Press Releases, Jun. 23, 2017, 4 pages.

Gunn, "Could this £6 gadget protect your wallet from fraudsters trying to 'skim' your contactless card details?" This is Money, Financial Website UK, published Apr. 15, 2016, 10 pages.

Instructables, "How to Disable contactless Payment on your Debit Card", Technology, Wireless, NTT, Posted Sep. 15, 2013, 16 pages, http://www.instructables.com/id/How-to-Disable-Contactless-Payment-on-Your-Debit-C/.

Mathis, "NXP develops touch, sensor, card, seals PIN transactions", SecureIDNews, Oct. 31, 2012, 6 pages.

Google Search, "Micro Buzzer Disk", printed Mar. 23, 2018, 2 pages.

Google Search, "Micro Vibration Motor", printed Mar. 23, 2018, 2 pages.

OWL, "OWL Card Minder—Contactless Credit/Debit Fraud Prevention", printed Mar. 23, 2018, 4 pages, https://www.owl.co.uk/cardminder/.

SignalVault, "Credit & Debit Card Protection Made Easy", printed Mar. 23, 2018, 9 pages, https://www.signal-vault.com/.

SmartMetric, "Your Fingerprint Now Used to Activate Your Credit Card's Wireless Function in a Dual Purpose NFC Contactless as Well as EMV Contact Biometric Credit Card by SmartMetric", Feb. 9, 2016, 2 pages.

Bachelor, "Conctactless card fraud is too easy, says Which?", The Guardian, Jul. 23, 2015, 3 pages.

Burgess-Pike, "Vaultskin Launches VAULTCARD™ in Bid to Combat Contactless Card Fraud", PRWEB News Center, Jul. 7, 2016, 5 pages.

YouTube, "Signal-Vault RFID Blocking Test—Fail", Published May 16, 2014, 2 pages, https://www.youtube.com/watch?v=BE2IWZyluHI.

IBM: List of IBM Patents or Patent Applications Treated as Related (Appendix P), Apr. 9, 2018, pp. 1-2.

Pending U.S. Appl. No. 15/934,056, filed Mar. 23, 2018, entitled: "Advance Alert System Against Copy of Contact-Less Card Information", pp. 1-18.

\* cited by examiner

METHOD AND APPARATUS TO ENHANCE THE SECURITY OF CONTACT-LESS CARDS

BACKGROUND

The present invention relates, generally, to the field of contact-less smart cards, and more specifically, to enhancing the security of smart contact-less cards.

A contact-less smart card is a contactless credential whose dimensions are credit card size. A contact-less smart card contains embedded integrated circuits that may store, and sometimes process, data and communicate with a terminal through communication protocols such as near-field communication (NFC) and radio-frequency identification (RFID). Contact-less smart cards may be used for business transactions, identification, authentication, and data storage.

BRIEF SUMMARY

A structure for a contact-less card, the contact-less card may include a touch sensor electrically coupled to a fixed power source. The contact-less card may include a contact-less communication controller electrically coupled to the touch sensor. The contact-less communication controller includes an integrated circuit containing card information. The integrated circuit transmits the card information based on a signal from the touch sensor. The contact-less card may include an antenna electrically coupled to the contact-less communication controller. The antenna transmits card information received from the contact-less communication controller.

A structure for a contact-less card, the contact-less card may include a touch sensor. The contact-less card may include a contact-less communication controller electrically coupled to the touch sensor. The contact-less communication controller includes an integrated circuit containing card information. The integrated circuit transmits the card information based on a signal from the touch sensor. The contact-less card may include an antenna electrically coupled to the contact-less communication controller. The antenna transmits card information received from the contact-less communication controller. The antenna is electrically coupled to the touch sensor.

DETAILED DESCRIPTION

Figure 1:
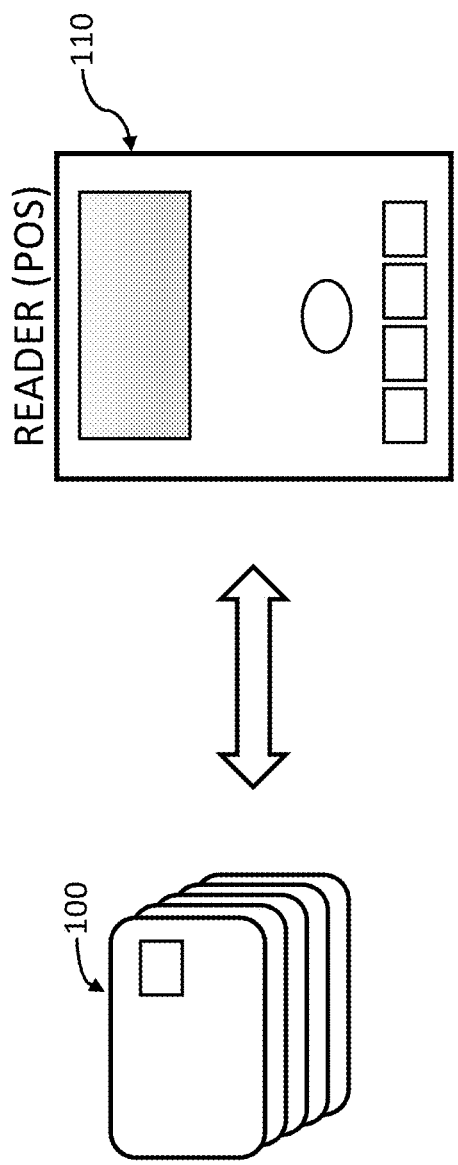
FIG. 1 illustrates a set of contact-less devices.

Near-field communication (NFC) is a set of communication protocols that enable two electronic devices to establish communication by bringing them within a short range of each other (e.g. 10 cm or less). The origins of NFC are rooted in radio-frequency identification (RFID) technology which allows compatible hardware to both supply power to and communicate with an otherwise passive (i.e. unpowered) electronic tag (e.g. an NFC tag/controller). An NFC tag typically includes an integrated circuit (IC) chip with control logic, and an antenna for radio communication. Active tags refer to those that have an internal power source; passive tags refer to those that don't have an internal power source. Active tags can transmit radio frequency information whether or not they are within the interrogation zone of an NFC reader. Passive tags are inductively powered by the radio frequency waves received from the NFC reader, and transmit, or "reflect," a modulated signal containing card information. Active tags are able to transmit much more information than passive tags. However, even passive tags are able to transmit on the order of several kilobits of information. Additionally, an NFC tag may contain a small amount of non-volatile memory which may be used to store personal data.

NFC technology may be used for social networking (e.g. sharing of contacts, photos, videos), identity documents, keycards, and for contact-less payment systems. As such, cards such as credit cards, debit cards, driver's licenses, and other identification cards have seen a technological shift towards contact-less card technologies such as RFID and NFC. For example, Europay, MasterCard, Visa (EMV) cards, which are currently used in the Americas and in many European nations, include integrated circuits and contact plates which may be placed in contact with readers inside payment terminals, and may include NFC circuits which engage in contact-less communications with NFC readers.

While EMV cards and other contact-less cards are relatively secure when implemented along with a magnetic stripe and/or a chip, the contact-less feature nevertheless renders a contact-less card vulnerable to a variety of attacks. For example, some contact-less cards transmit certain account holder information to nearby (e.g. within 10 cm or greater) card readers without encryption. Such information is vulnerable to skimming attacks in which a card reader, which may be concealed, may be used to gain unauthorized access to account holder information (e.g. card number, expiration date). Contact-less cards are also vulnerable to relay attacks in which some attacker relays communications between contact-less cards and contact-less card readers to engage in unauthorized transactions. In view of these and other vulnerabilities of contact-less cards, there is a need for enhanced security within the contact-less card to protect contact-less cardholders and issuers from theft and fraudulent activity.

Embodiments of the present invention disclose an enhanced contact-less card 200, described below, which provides a method and apparatus for enhancing the security of the contact-less card. In embodiments of the invention, enhanced contact-less card 200 may be a contact-less credit/debit card which includes, in addition to an integrated contact-less communication controller and antenna, an integrated touch sensor and an integrated touch relay powered by an integrated power source. In embodiments of the invention, the integrated contact-less communication controller may be configured for NFC transmission (i.e. an NFC controller) or for RFID transmission (i.e. an RFID controller). Embodiments, and accompanying figures, of the invention may make reference to an NFC controller by way of example only and are not intended to limit the integrated contact-less communication controller to a configuration for an NFC controller. In embodiments of the invention, the integrated touch sensor may detect the touch of a finger or hand and as a result transmit, via the integrated touch relay, a signal to the integrated NFC controller. In embodiments of the invention, the integrated NFC controller may be disabled by default and may only become enabled, and thus able to transmit, via the integrated antenna, account holder information stored within the card to a NFC reader in close proximity, when both a cardholder is in physical contact with the integrated touch sensor and a voltage is present within the antenna.

Embodiments of the present invention will now be described, by way of example only, in detail with reference to the accompanying Figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. Moreover, NFC cards are used throughout this disclosure as one example of contact-less cards, however, the techniques disclosed herein may be applied in connection with any contact-less card technologies that are designed for short range communications.

FIG. 1 illustrates a set of contact-less devices 100, which in various embodiments may be smart credit or debit cards, transportation system fare cards, access badges, etc. Each card contains an NFC circuit that allows it to communicate with a reader, such as point of sale (POS) reader 110, when the card is placed in close proximity to the reader. Various types of readers and contact-less card technologies exist; for example, smart credit cards use a different contact-less card transport technology than access badges. As used herein the terms "transport technology", "communication protocol", and similar phrases mean the same thing and refer to a specific physical layer and media access layer used for contact-less card communications by a particular smart card or access badge.

Figure 2:
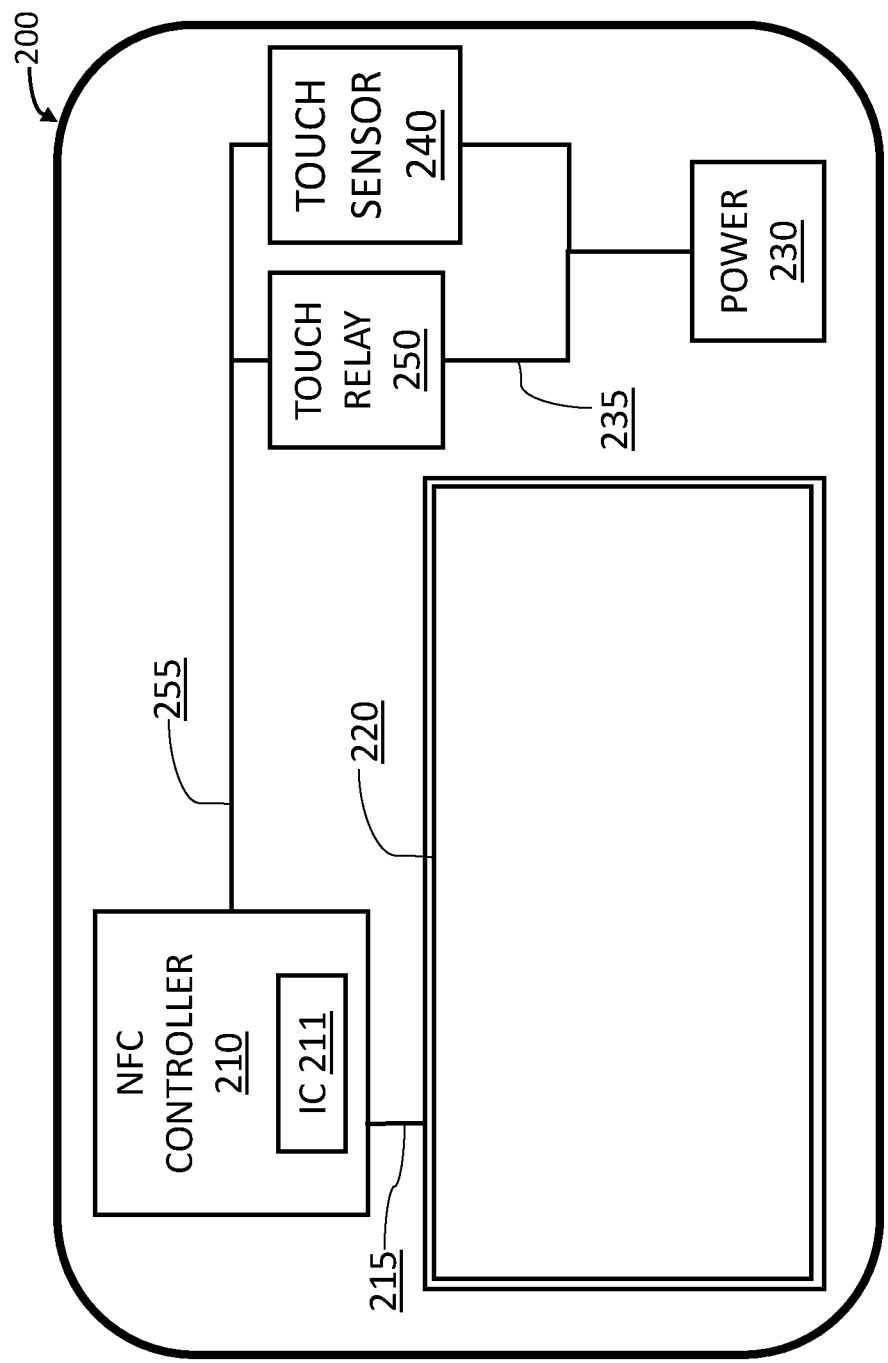
FIG. 2 illustrates an enhanced contact-less card, in accordance with an embodiment of the present invention.

FIG. 2 illustrates an enhanced contact-less card 200, representative of a credit/debit card, in accordance with an embodiment of the present invention. In an example embodiment, enhanced contact-less card 200 may include NFC controller 210, antenna 220, power 230, touch sensor 240, and touch relay 250, interconnected via electrical connections 215, 235, and 255. Electrical connection 215 interconnects antenna 220 and NFC controller 210. Electrical connection 235 interconnects power 230, touch sensor 240, and touch relay 250. Electrical connection 255 interconnects touch sensor 240, and touch relay 250, and NFC controller 210. In other embodiments, enhanced contact-less card 200 may also include technologies which implement contact-based card functions (e.g. a contact plate, a magnetic strip). Furthermore, in various embodiments, enhanced contact-less card 200 may implement any available contact-less card technologies and/or contact-less card technologies which may be developed subsequent to this disclosure. Currently available contact-less card technologies include, e.g., RFID and NFC technologies, each of which is defined by a variety of technical specifications. The technical specifications are updated and modified on an ongoing basis by the authorities responsible for RFID, NFC, and supporting standards. Enhanced contact-less card 200 may implement any RFID and/or NFC technical specification, as will be appreciated by those of skill in the art. The operations and functions of contact-less card 200 are described in further detail below with regard to FIG. 4 and FIG. 5.

In an example embodiment, NFC controller 210 may include an integrated circuit (IC) chip 211 inlayed on a dielectric backing. IC chip 211 may be connected, via electrical connection 215, to antenna 220 which may also be inlayed on the same dielectric backing as IC chip 211. In an example embodiment, IC chip 211 may be any microprocessor device configured to exchange data electromagnetically. IC chip 211 may include a radio frequency inductor, volatile or non-volatile memory storage, a microprocessor, and/or circuitry logic. Additionally, NFC controller 210 may include a small amount of non-volatile memory (not shown), for example, some kind of EEPROM, which may be used to store information. In an example embodiment, IC chip 211 may contain circuitry logic to enable NFC controller 210 to transmit card information. The circuitry logic within IC chip 211 may enable NFC controller 210 upon the satisfaction of two conditions, namely, the presence of a high signal from touch relay 250 and the presence of a sufficient induced voltage in antenna 220. The induced voltage within antenna 220 may result from impinging radio frequency electromagnetic waves from, for example, an NFC reader (not shown). IC chip 211 may modulate the induced voltage in antenna 220 in accordance with data and logic stored within the non-volatile memory as a means for transmitting information to the NFC reader. In various embodiments, the dielectric backing can be, for example, a credit/debit card or other smart card, an identification badge, etc. In an example embodiment, NFC controller 210 and IC chip 211 may be implemented within a credit card. In response to the presence of both a sufficient induced voltage in antenna 220 and a high signal (i.e. touch signal) from touch relay 250, NFC controller 210 may become enabled and transmit, via IC chip 211 and antenna 220, card information such as: cardholder name, card issuer (e.g. Visa, AMEX), bank name, purchase history, card type, 16-digit account number, country code, expiration date, and issue date. On the other hand, if NFC controller 210 does not detect a high signal from touch relay 250, NFC controller 210 may not be enabled and thus unable to transmit card information.

In embodiments of the invention, antenna 220 may be a thin wire coil which wraps around some or all of the perimeter and/or surface area of a dielectric backing, inlayed within enhanced contact-less card 200, in one or more turns, forming an antenna for receiving the radio frequency transmission from a nearby contact-less card reader. In other embodiments, antenna 220 may be printed on top of enhanced contact-less card 200. Furthermore, in embodiments of the invention, antenna 220 may operate to utilize the received radio frequency transmission to energize NFC controller 210 (i.e. electromagnetic induction) and to transmit card information as determined by logic within IC chip 211.

In an example embodiment, power 230 represents an internal source of electric power for touch sensor 240 and touch relay 250. In an example embodiment, power 230 may be any commercially available or proprietary thin film lithium ion or lithium-polymer battery capable of powering touch sensor 240 and touch relay 250, in accordance with embodiments of the invention. Alternatively, in another embodiment, touch sensor 240 and touch relay 250 may be powered by a nearby NFC reader through electromagnetic induction of antenna 220.

Figure 3:
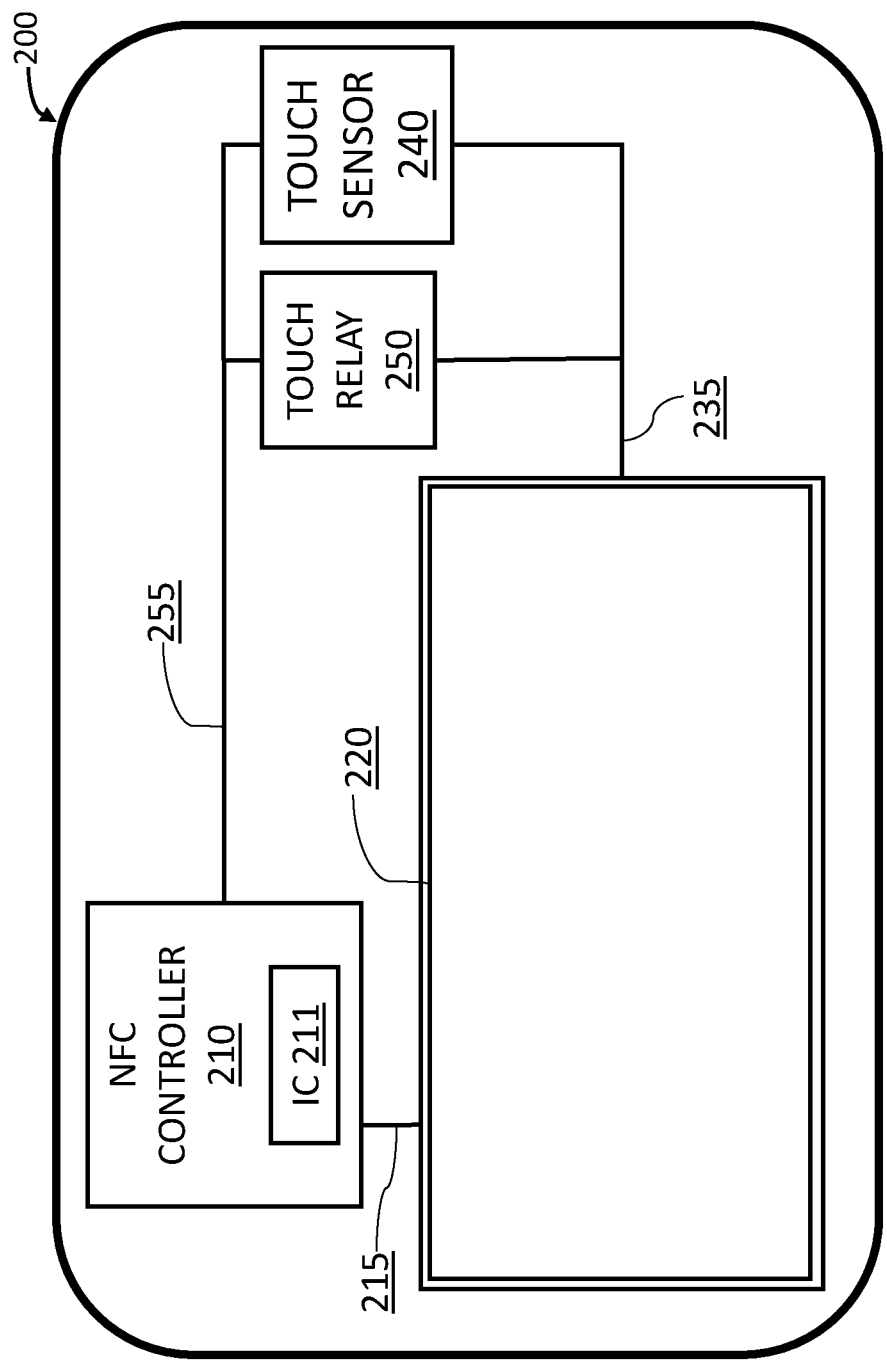
FIG. 3 illustrates an enhanced contact-less card, in accordance with another embodiment of the present invention.

For example, FIG. 3 illustrates an enhanced contact-less card 200, representative of a credit/debit card, in accordance with another embodiment of the present invention where touch sensor 240 and touch relay 250 are powered as a result of electromagnetic induction of antenna 220. In such an embodiment, touch sensor 240 and touch relay 250 may be interconnected with antenna 220 via electrical connection 235. In such an embodiment, impinging radio frequency electromagnetic waves from, for example, a nearby NFC reader (not shown), may induce a voltage within antenna 220 sufficient to power touch sensor 240 and touch relay 250 via electrical connection 235.

In embodiments of the invention, touch sensor 240 represents a physical device that senses physical contact with a holder of enhanced contact-less card 200. In embodiments of the invention, touch sensor 240 may determine physical contact from the cardholder through human capacitance. Touch sensor 240 may be a material, or apparatus, that changes the electric state of current passing between touch sensor 240 and touch relay 250 when a cardholder comes into contact with touch sensor 240. In an example embodiment, touch sensor 240 may cover a designated surface area of enhanced contact-less card 200. However, in another embodiment, touch sensor 240 may cover the entire surface area of enhanced contact-less card 200. For example, touch sensor 240 may detect physical contact as a result of the cardholder touching the designated touch sensor area with a digit (i.e. finger, thumb) or as a result of being in the cardholder's hand. Furthermore, in embodiments of the invention, touch sensor 240 may send, via electrical connection 255, a signal to touch relay 250 upon detecting physical contact with the cardholder.

In embodiments of the invention, touch relay 250 represents an integrated circuit which operates to detect a signal, received from touch sensor 240, indicating that enhanced contact-less card 200 is in physical contact with a cardholder. Furthermore, in response to receiving a signal from touch sensor 240, touch relay 250 may also operate to transmit, via electrical connection 255, a high signal to IC chip 211 within NFC controller 210. In an example embodiment, the high signal transmitted to IC chip 211 may have the effect of enabling NFC controller 210 such that NFC controller 210 may transmit card information when detecting a sufficient induced voltage in antenna 220 in addition to the high signal received from touch relay 250. In the event that IC chip 211 does not detect a high signal from touch relay 250, NFC controller 210 may remain disabled and unable to transmit card information.

Figure 4:
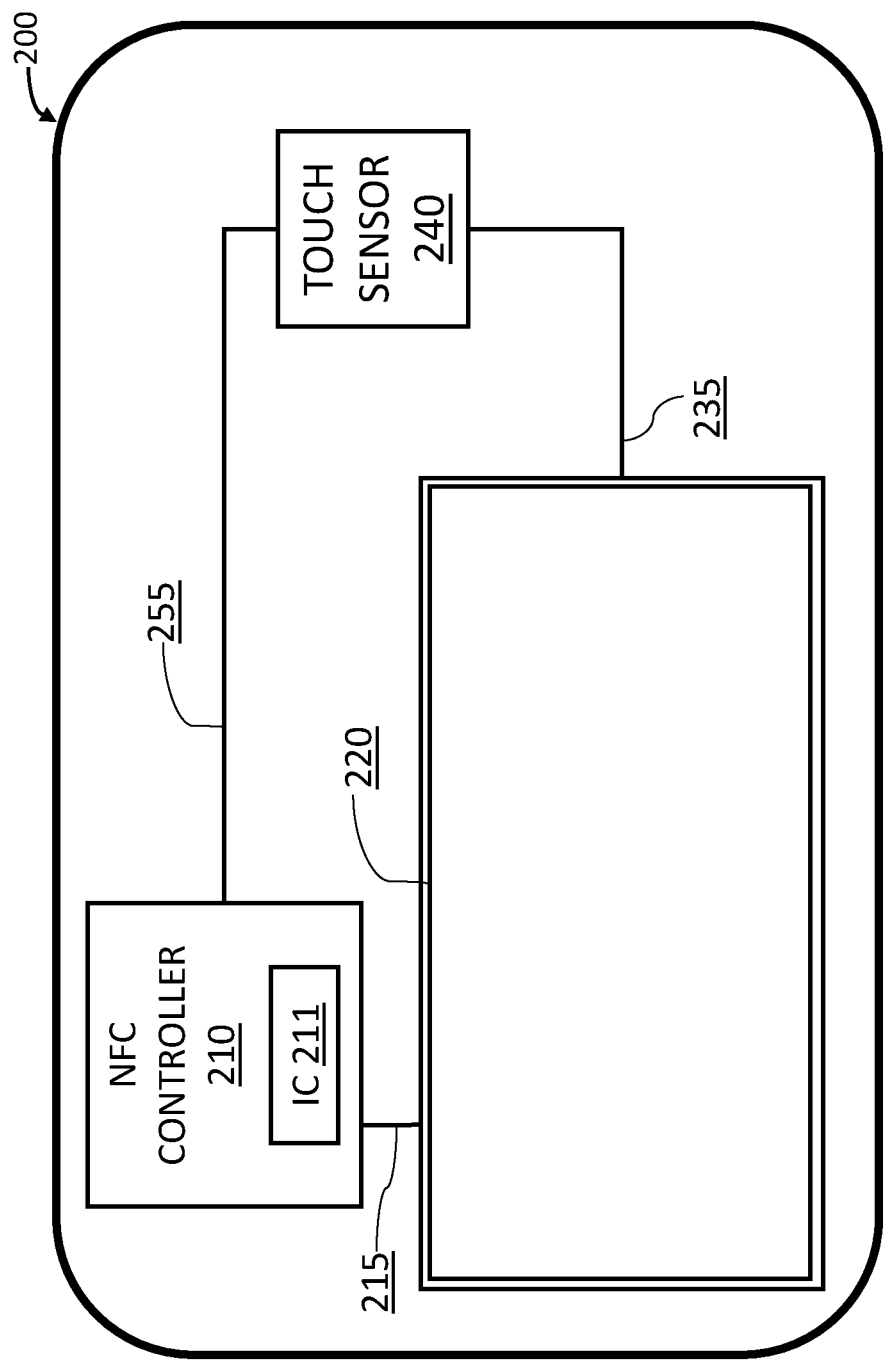
FIG. 4 illustrates an enhanced contact-less card, in accordance with another embodiment of the present invention.

In another embodiment, the operations and functions of touch relay 250 may be incorporated within IC chip 211, such that IC chip 211 may be able to directly receive the high signal from touch sensor 240. For example, FIG. 4 illustrates an enhanced contact-less card 200, representative of a credit/debit card, in accordance with another embodiment of the present invention where touch sensor 240 may detect physical contact as a result of the cardholder touching the designated touch sensor area with a digit or as a result of being in the cardholder's hand. In response to detection of physical contact, touch sensor 240 may transmit, via electrical connection 255, a high signal directly to IC chip 211. In such an embodiment, IC chip 211 may be further configured to detect the high signal from touch sensor 240. Furthermore, in such an embodiment, touch sensor 240 may be powered as a result of electromagnetic induction of antenna 220, as touch sensor 240 may be interconnected with antenna 220 via electrical connection 235. Impinging radio frequency electromagnetic waves from, for example, a nearby NFC reader (not shown), may induce a voltage within antenna 220 sufficient to power touch sensor 240 via electrical connection 235.

In embodiments of the invention, electrical connections 215, 235, and 255 represent electrical connections which form direct connections between power 230, touch sensor 240, touch relay 250, NFC controller 210, and antenna 220.

Figure 5:
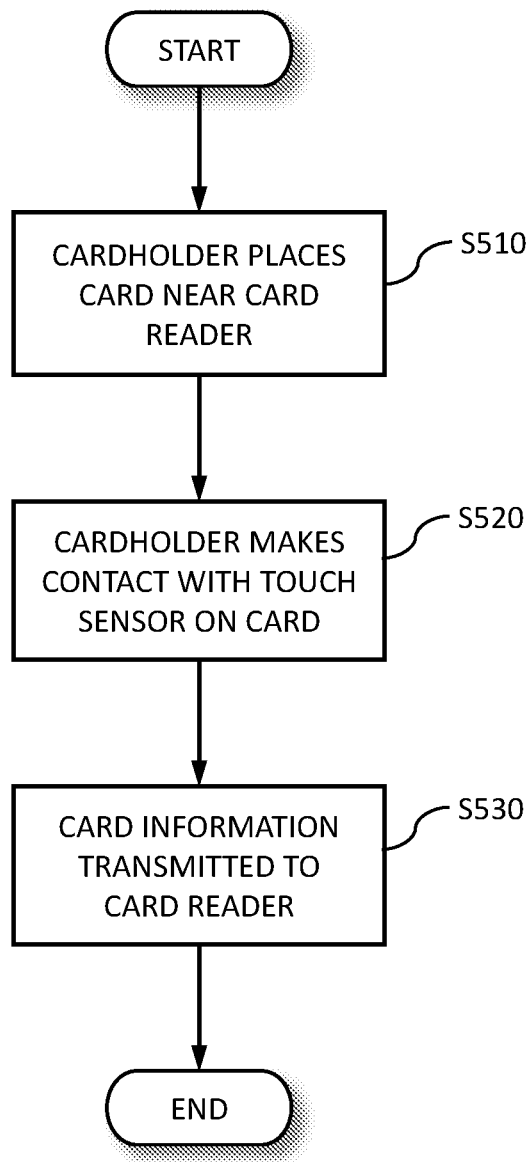
FIG. 5 is an example use case illustrating the operations of the contact-less card of FIG. 2, in accordance with an embodiment of the present invention.

FIG. 5 describes a use case illustrating the operations of enhanced contact-less card 200 during an intended use, in accordance with an embodiment of the invention. Referring to step S510, a cardholder may place enhanced contact-less card 200 in close proximity to a card reader such as a NFC card reader. This action may be in response to a requested payment in connection with a transaction which is known and authorized by the cardholder. The close proximity to the NFC card reader may produce a voltage within antenna 220 as a result of electromagnetic induction from the nearby NFC card reader. The induced voltage within antenna 220 may be sufficient to power the components (i.e. IC chip 211, non-volatile memory) within NFC controller 210, via electrical connection 215. Furthermore, circuitry logic within IC chip 211 may operate to detect the presence of the induced voltage within antenna 220, via electrical connection 215.

Referring to step S520, the cardholder may make physical contact with touch sensor 240 on enhanced contact-less card 200. In an example embodiment, physical contact with touch sensor 240 may result from the cardholder touching touch sensor 240 with a digit. In another embodiment, physical contact with touch sensor 240 may result from enhanced contact-less card 200 being held within the cardholder's hand. Touch sensor 240 may implement capacitive touch technology to detect changes the electric state of current passing between touch sensor 240 and touch relay 250. When a change occurs in the electric state of current passing between touch sensor 240 and touch relay 250 (i.e. as a result of physical contact with touch sensor 240), touch sensor 240 transmits, via electrical connection 255, a signal to touch relay 250 for as long as the physical contact is occurring. If physical contact with touch sensor 240 does not occur, then touch sensor 240 does not transmit a signal to touch relay 250. In an example embodiment, touch relay 250 may receive, via electrical connection 255, a signal from touch sensor 240 upon the occurrence, and for the duration, of physical contact with touch sensor 240. Furthermore, for as long as touch relay 250 is receiving a signal from touch sensor 240, touch relay 250 may transmit a high signal to IC chip 211, via electrical connection 255. Circuitry logic within IC chip 211 may also operate to detect the presence of the high signal received from touch relay 250.

Referring to step S530, IC chip 211 may enable, via internal circuitry logic, NFC controller 210 upon the satisfaction of two conditions, namely, the presence of a sufficient induced voltage in antenna 220 and the presence of a high signal from touch relay 250. In the event one of these two conditions is not satisfied, NFC controller 210 is disabled. In an example embodiment, once the conditions of an induced voltage within antenna 220 and a high signal from touch relay 250 are both satisfied, IC chip 211 enables NFC controller 210. Once enabled, NFC controller 210 may transmit, via antenna 220, card information (e.g. cardholder name, card issuer (e.g. Visa, AMEX), bank name, purchase history, card type, 16-digit account number, country code, expiration date, issue date) to allow for the process of payment and complete the transaction.

Figure 6:
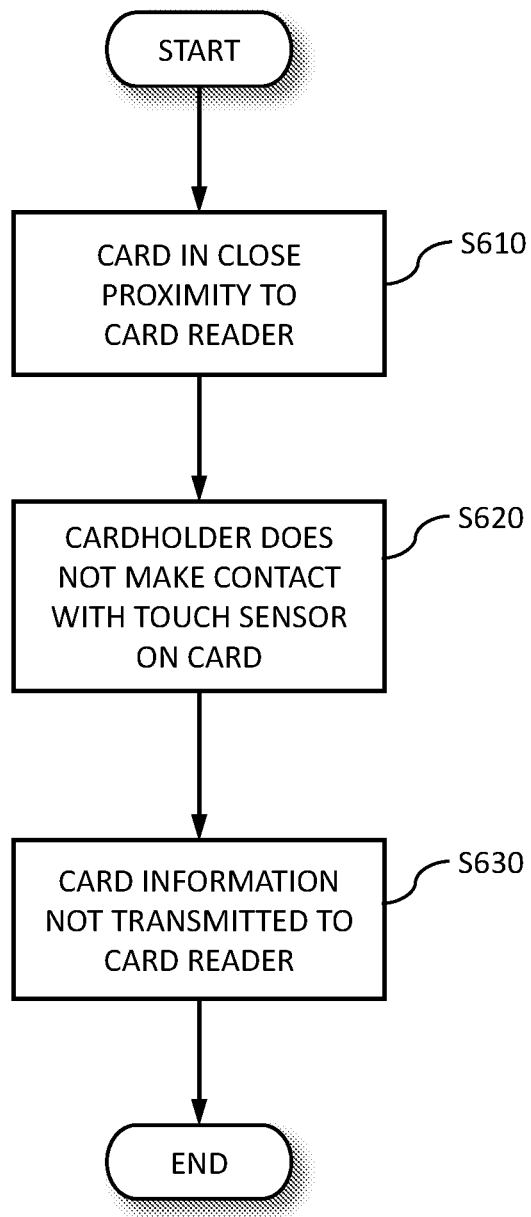
FIG. 6 is an example use case illustrating the operations of the contact-less card of FIG. 2, in accordance with an embodiment of the present invention.

FIG. 6 describes a use case illustrating the operations of enhanced contact-less card 200 during an unintended use, in accordance with an embodiment of the invention. Referring to step S610, a cardholder may be in a location where enhanced contact-less card 200 is, unknowingly and unintendedly, located in close proximity to a card reader such as a NFC card reader. For example, the cardholder may be in a populated public space such as a shopping center or a crowded train car. Such a location may afford a malicious actor the opportunity to place a concealed NFC card reader in close proximity to enhanced contact-less card 200 and attempt to steal card information via the concealed NFC card reader (e.g. an NFC enabled smartphone, a chip reader, any active NFC device). This is known as skimming. The close proximity to the NFC card reader may produce a voltage within antenna 220 as a result of electromagnetic induction from the nearby NFC card reader. The induced voltage within antenna 220 may be sufficient to power the components (i.e. IC chip 211, non-volatile memory) within NFC controller 210, via electrical connection 215. Furthermore, circuitry logic within IC chip 211 may operate to detect the presence of the induced voltage within antenna 220, via electrical connection 215.

Referring to step S620, in such a location the cardholder may not be in physical contact with touch sensor 240 on enhanced contact-less card 200 as the cardholder may store enhanced contact-less card 200 in a pocket, wallet, or other container when not in use for an intended transaction. Touch sensor 240 may implement capacitive touch technology to detect changes the electric state of current passing between touch sensor 240 and touch relay 250. When a change occurs in the electric state of current passing between touch sensor 240 and touch relay 250 (i.e. as a result of physical contact with touch sensor 240), touch sensor 240 transmits, via electrical connection 255, a signal to touch relay 250 for as long as the physical contact is occurring. If physical contact with touch sensor 240 does not occur, then touch sensor 240 does not transmit a signal to touch relay 250. In an embodiment, touch relay 250 may not receive, via electrical connection 255, a signal from touch sensor 240 in the absence of physical contact with touch sensor 240. Furthermore, while touch relay 250 is not receiving a signal from touch sensor 240, touch relay 250 may not transmit a high signal to IC chip 211, via electrical connection 255. Circuitry logic within IC chip 211 may also operate to detect the absence of a high signal from touch relay 250.

Referring to step S630, IC chip 211 may enable, via internal circuitry logic, NFC controller 210 upon the satisfaction of two conditions, namely, the presence of a sufficient induced voltage in antenna 220 and the presence of a high signal from touch relay 250. In the event one, or both, of these two conditions is not satisfied, NFC controller 210 is disabled. In an embodiment where the condition of an induced voltage within antenna 220 is satisfied while the condition of a high signal from touch relay 250 is unsatisfied, IC chip 211 may not enable NFC controller 210. Accordingly, NFC controller 210 may not transmit, via antenna 220, card information (e.g. cardholder name, 16-digit account number, expiration date, issue date) to the concealed NFC card reader and therefore prevent the malicious actor from skimming card information from enhanced contact-less card 200.

The descriptions of the various embodiments of the present invention have been presented for purposes of illustration, but are not intended to be exhaustive or limited to the embodiments disclosed. The terminology used herein was chosen to explain the principles of the one or more embodiments, the practical application or technical improvement over technologies found in the marketplace, or to enable others of ordinary skill in the art to understand the embodiments. Various modifications, additions, substitutions, and the like will be apparent to those of ordinary skill in the art without departing from the scope and spirit of the invention, as defined in the following claims.

Furthermore, although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

What is claimed is:

1. A contact-less card, the contact-less card comprising:
    a touch sensor electrically coupled to a fixed power source;
    a contact-less communication controller electrically coupled to the touch sensor, wherein the contact-less communication controller comprises an integrated circuit containing card information, and wherein the integrated circuit transmits the card information based on a signal from the touch sensor and based on a change occurring in an electric state of current passing between the touch sensor and a touch relay; and
    an antenna electrically coupled to the contact-less communication controller, wherein the antenna transmits card information received from the contact-less communication controller.

2. The contact-less card of claim 1, wherein the contact-less communication controller is configured for NFC transmission or RFID transmission.

3. The contact-less card of claim 1, wherein an induced voltage within the antenna powers the integrated circuit.

4. The contact-less card of claim 1, wherein the integrated circuit comprises a microprocessor device configured to exchange data electromagnetically.

5. The contact-less card of claim 1, wherein the antenna comprises a thin-wire coil configured to receive a radio frequency transmission, and wherein a radio frequency magnetic field associated with the received radio frequency transmission induces a voltage within the antenna.

6. The contact-less card of claim 1, wherein the touch sensor comprises a capacitive touch sensor.

7. The contact-less card of claim 6, wherein the touch sensor changes an electric state of current passing between the touch sensor and the integrated circuit based on physical contact with the touch sensor.

8. The contact-less card of claim 6, wherein the touch sensor transmits the signal to the integrated circuit based on physical contact with the touch sensor.

9. The contact-less card of claim 1, wherein the fixed power source comprises a thin film lithium ion or lithium-polymer battery.

10. The contact-less card of claim 9, wherein the fixed power source powers the touch sensor.

11. A contact-less card, the contact-less card comprising:
    a touch sensor;
    a contact-less communication controller electrically coupled to the touch sensor, wherein the contact-less communication controller comprises an integrated circuit containing card information, and wherein the integrated circuit transmits the card information based on a signal from the touch sensor and based on a change occurring in an electric state of current passing between the touch sensor and a touch relay; and
    an antenna electrically coupled to the contact-less communication controller, wherein the antenna transmits card information received from the contact-less communication controller, and wherein the antenna is electrically coupled to the touch sensor.

12. The contact-less card of claim 11, wherein the contact-less communication controller is configured for NFC transmission or RFID transmission.

13. The contact-less card of claim 11, wherein an induced voltage within the antenna powers the integrated circuit.

14. The contact-less card of claim 11, wherein an induced voltage within the antenna powers the touch sensor.

15. The contact-less card of claim 11, wherein the integrated circuit comprises a microprocessor device configured to exchange data electromagnetically.

16. The contact-less card of claim 11, wherein the antenna comprises a thin-wire coil configured to receive a radio frequency transmission, and wherein a radio frequency magnetic field associated with the received radio frequency transmission induces a voltage within the antenna.

17. The contact-less card of claim 11, wherein the touch sensor comprises a capacitive touch sensor.

18. The contact-less card of claim 17, wherein the touch sensor changes an electric state of current passing between the touch sensor and the integrated circuit based on physical contact with the touch sensor.

19. The contact-less card of claim 17, wherein the touch sensor transmits the signal to the integrated circuit based on physical contact with the touch sensor.

\* \* \* \* \*